United States Patent [19]
Craig

[11] Patent Number: 5,727,755
[45] Date of Patent: Mar. 17, 1998

[54] AIRCRAFT ENGINES WITH A CONTROLLABLE OUTER CASING

[76] Inventor: Alfred C. Craig, Little Foxes Briar Court, 45 Appledore Road, Tenterden, Kent, England

[21] Appl. No.: 759,305

[22] Filed: Dec. 2, 1996

Related U.S. Application Data

[63] Continuation-in-part of Ser. No. 438,706, May 11, 1995, abandoned, which is a continuation-in-part of Ser. No. 184,396, Jan. 21, 1994, abandoned.

[51] Int. Cl.$^6$ .................................................. B64D 29/00
[52] U.S. Cl. .......................... 244/53 R; 244/54; 60/226.3
[58] Field of Search ............................. 244/53 R, 54; 60/226.3, 262, 269; 137/15.1, 15.2

[56] References Cited

U.S. PATENT DOCUMENTS

| | | |
|---|---|---|
| 2,921,434 | 1/1960 | Spardaro et al. |
| 3,161,018 | 12/1964 | Sandre. |
| 4,049,220 | 9/1977 | Rodgers. |
| 4,175,384 | 11/1979 | Wagenknecht et al. |
| 4,409,788 | 10/1983 | Nash et al. |

*Primary Examiner*—Andres Kashnikow
*Assistant Examiner*—Tien Dinh
*Attorney, Agent, or Firm*—Clifford A. Poff

[57] ABSTRACT

An aircraft comprises at least one jet engine having a surrounding, open-ended duct coaxial with the engine and spaced therefrom radially to define a passage of annular cross-section. The casing or duct extends upstream and downstream of the jet engine and tapers internally in the forward direction over a region, in which a leading edge of a casing of the jet engine is disposed. Upstream of the tapering region, the interior of the duct forms a cylindrical entry section of the passage through the duct, in which an axially displayable open-ended tube is disposed, spaced radially from the wall of the entry section of the duct passage. The duct is mounted for axial movement relative to the jet engine whereby the width of the annular gap defined between the leading edged of the casing of the jet engine and the tapering portion of the passage through the duct can be varied to control the amount of air bypassing the jet engine within the duct, and thereby adapt the aircraft propulsion system to different flying conditions.

11 Claims, 15 Drawing Sheets

AIRCRAFT ENGINES WITH A CONTROLLABLE OUTER CASING

CROSS REFERENCE TO RELATED APPLICATIONS

This patent application is a continuation-in-part of patent application Ser. No. 08/438,706, filed May 11, 1995, which is a continuation-in-part of patent application Ser. No. 08/184,396, filed Jan. 21, 1994, both now abandoned.

BACKGROUND OF THE INVENTION

1. Field of the Invention

This invention relates to jet powered aircraft.

It is an object of this invention to improve the propulsive effectiveness of a jet propelled aircraft in flight in respect of its jet engine thrust.

More particularly, it is an object of the invention to provide a jet propelled aircraft with a means whereby more effective adjustment of its operating characteristics can be made to maximize its propulsive efficiency at all forward speeds and altitudes. The invention comprises a system that specifically facilitates overcoming the poor propulsive efficiency of the existing forms of jet powered aircraft in flight by facilitating the establishment of a fully integrated air mass motion system cycle comprising its two principal air mass motion systems, the first acting directly through it, the second around it, with that of the aircraft's structure, by which systems means, full control over its propulsive efficiency at all demand conditions can be exercised.

SUMMARY OF THE PRESENT INVENTION

According to the present invention, there is provided an aircraft comprising an airframe structure, at least one jet engine, including a compressor and a turbine, rotatable about an axis of the jet engine, a first hollow casing enclosing said compressor and turbine and defining at opposite ends of said casing an inlet opening and an exhaust outlet centered on said engine axis at least one support member extending outwardly from said first hollow casing to said airframe structure, a second hollow casing enclosing said first hollow casing and spaced therefrom to define therewith an annular duct centered on said engine axis, said second hollow casing having an inlet opening centered on said axis and disposed upstream of said inlet opening of the first hollow casing, an outlet opening centered an said axis and disposed downstream of said exhaust outlet of said first casing, the or each said support member extending through said annular duct and through a respective longitudinal slot in said second hollow casing, said second hollow casing having a first internal diameter at a first position upstream of said first casing, a second internal diameter at a position downstream of the inlet opening of said first casing and a region between said first and second positions over which the internal diameter increases from said first position to the second position, the aircraft including means mounting said second hollow casing for longitudinal movement relative to said jet engine and said first hollow casing, whereby an annular entrance opening to said annular duct, said annular entrance opening defined by the leading end of said first casing and said region of the outer casing between said first and second position, can be varied in size whereby, in use, the quantity of air by-passing the jet engine via said annular duct can be varied.

It has been found that an analogous arrangement also has advantages in relation to marine or aquatic propulsion systems in which vessels are driven, in effect, by imparting velocity to water drawn from the water surrounding a vessel, rather than to air drawn from the surrounding air.

BRIEF DESCRIPTION OF THE DRAWINGS

Some embodiments of the invention will now be described, by way of example, with reference to the accompanying drawings, in which.

DETAILED DESCRIPTION OF THE PREFERRED EMBODIMENTS

Figure 1:
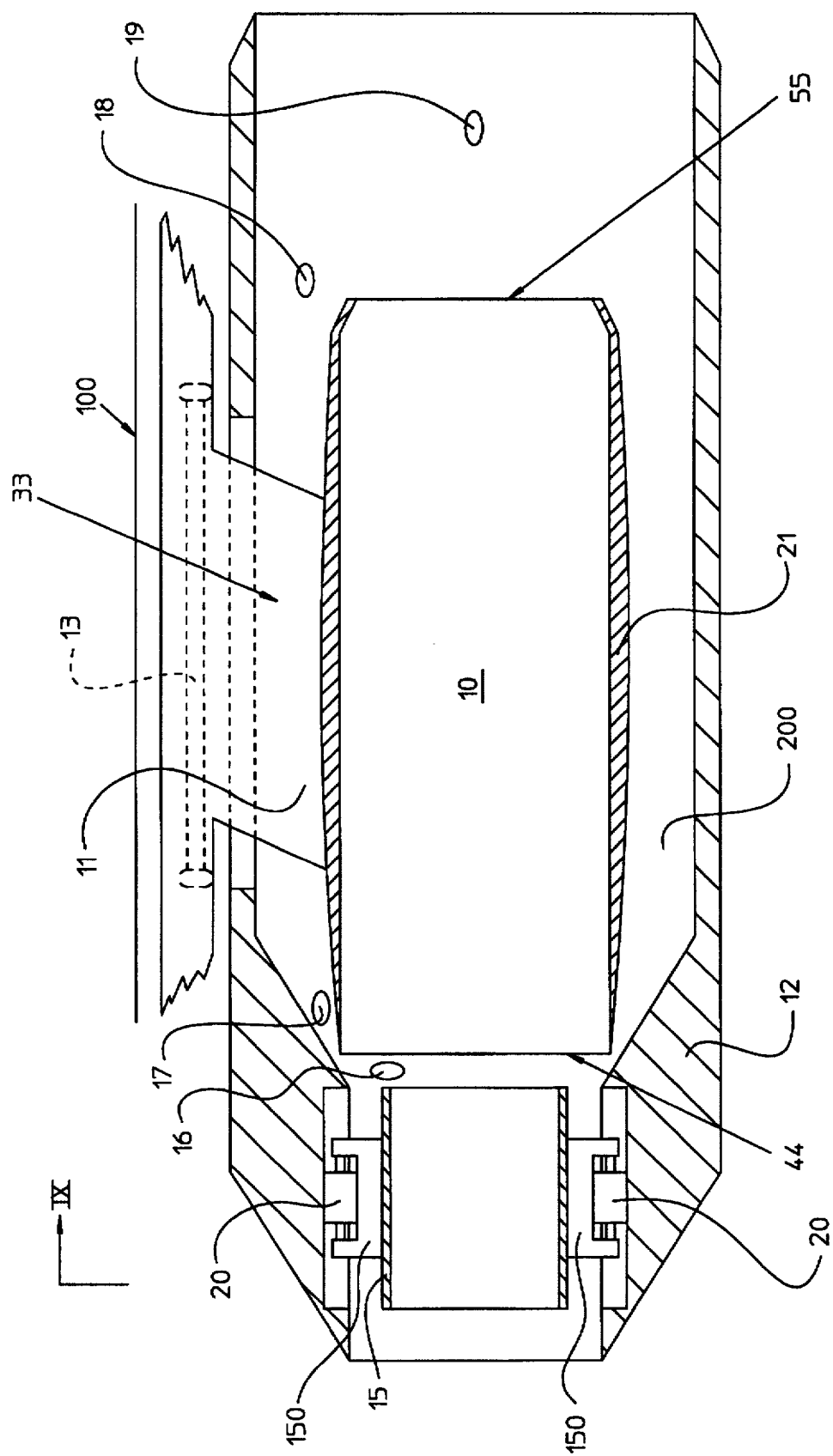
FIG. 1 is a diagrammatic view in vertical longitudinal section through a first embodiment of a system according to the present invention, taken along the axis of a jet engine incorporated in the system.

In each of the embodiments described, similar parts are identified by the same reference numerals in each of the Figures. Each of FIGS. 1 to 4 and 12 to 15 illustrate, schematically, a pan of an aircraft, including a propulsion system including a jet engine. It will be understood that whereas, for ease of illustration, FIGS. 1 to 4 and 12 to 15 show the duct or casing 12 and the casing 21 as being solid, they are in practice of hollow built-up constructions, in the same way as aircraft pans commonly are, including inner and outer shells or cladding with intervening framework.

Figure 4:
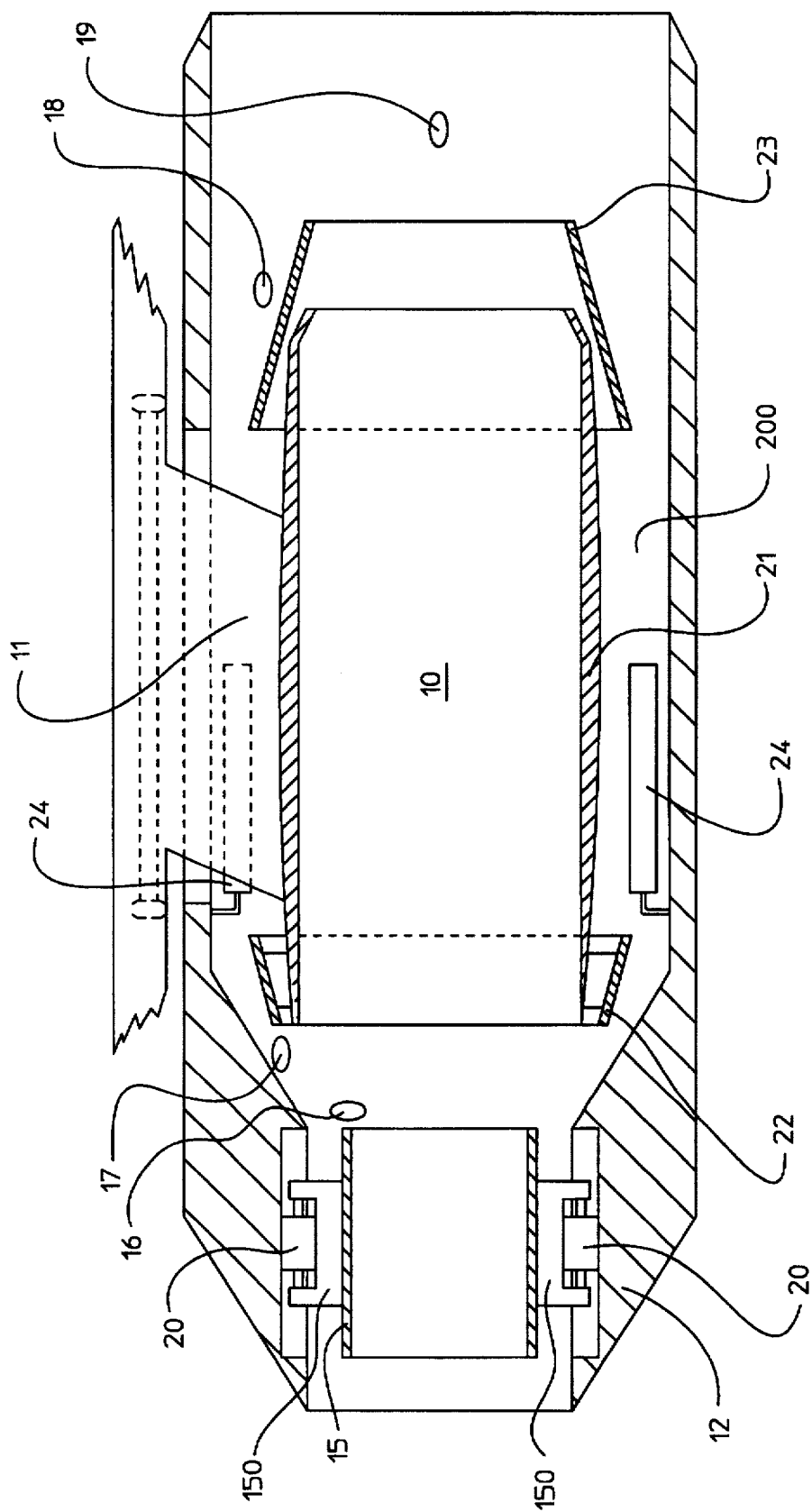
FIG. 4 is a diagrammatic view, similar to FIGS. 1 to 3, in longitudinal section through a fourth embodiment.
Figure 5:
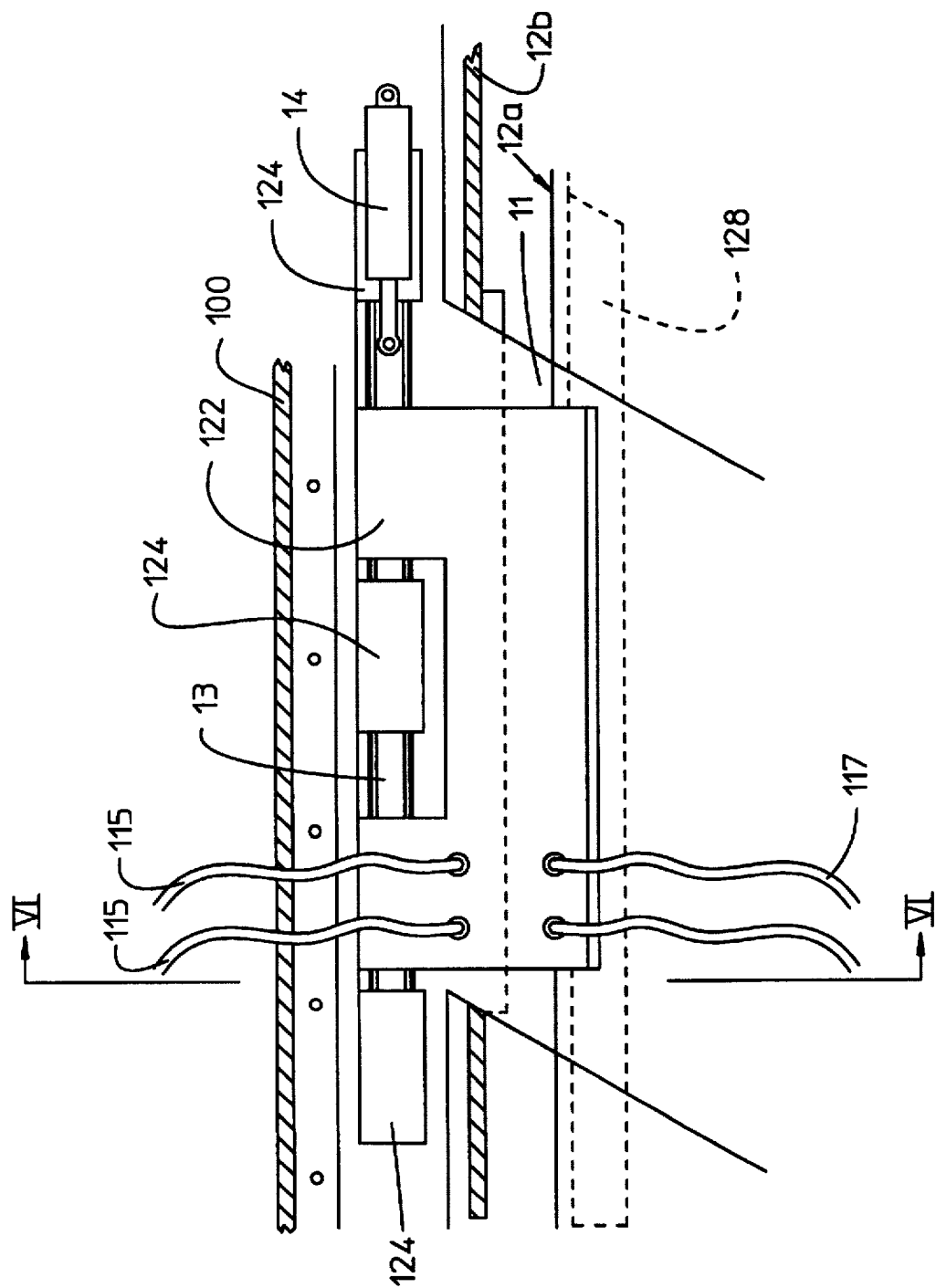
FIG. 5 is a fragmentary view, in vertical section along the line V—V of FIG. 6.
Figure 6:
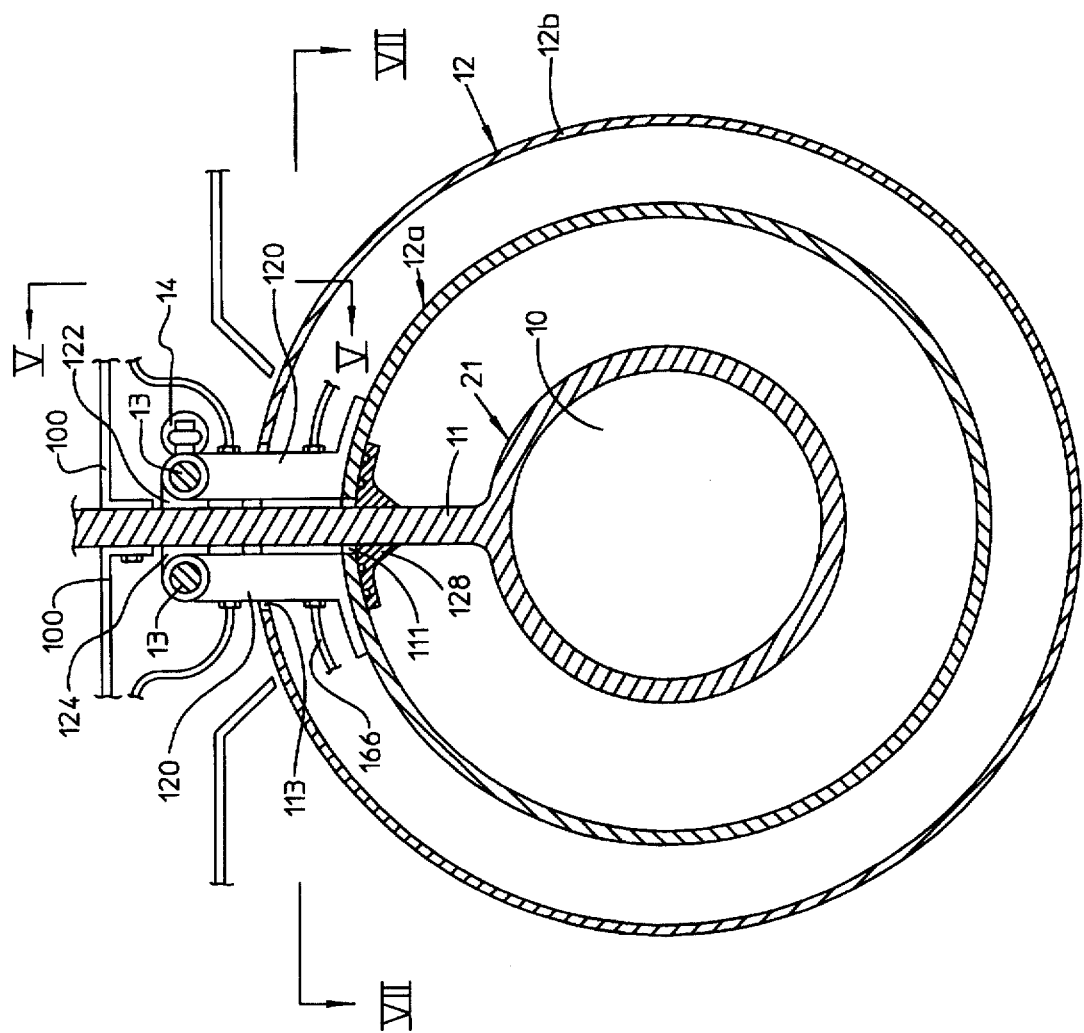
FIG. 6 is a fragmentary view in section along the line VI—VI in FIG. 5 and corresponds to a cross-sectional view along line VI—VI in schematic FIG. 1.

The propulsion system shown in FIG. 1 comprises a jet engine 10 which may be a conventional gas turbine jet propulsion engine with or without a by-pass system. The engine 10 includes a conventional stator (not shown in any detail), having an outer casing indicated at 21. Within the stator, a conventional rotor is rotationally supported in conventional manner. For ease of illustration, and because it is entirely conventional, this rotor is likewise not shown in FIGS. 1 to 9. The casing 21 surrounding engine 10 defines at a front end of casing 21 an inlet opening and at an opposite rear end of casing 21 an exhaust outlet centered on the engine axis. The engine 10 is supported from the aircraft structure (as described below by reference to FIGS. 5, 6 and 7) by a pylon 11. The engine is located within a duct 12 which surrounds the engine and which is mounted on mounting rails 13 for axial movement relative to the engine 10 and to the aircraft structure, as best shown in FIGS. 5 and 6. The duct 12 is open at its front, inlet end and at its rear, outlet end. Duct 12 is moved by a double-acting actuating ram 14, (not shown in FIG. 1 but shown in FIGS. 5 and 6). The duct 12 takes the form of a further hollow casing enclosing engine casing 21 and is coaxial with the engine and spaced from the engine casing 21 to define therewith an annular-section passage 200. Duct 12 has its inlet opening centered on the engine axis and disposed upstream of said inlet opening of the engine casing 21. Duct 12 likewise has its outlet opening centered on the engine axis and disposed downstream of the exhaust outlet of engine casing 21. The hollow casing or duct 12 has a first internal diameter over a region extending from the inlet opening of duct 12 to a first position still slightly upstream of engine casing 21, a second, greater, internal diameter at a position downstream of the inlet opening of engine casing 21 and a frusto-conical region between said first and second positions over which the internal diameter increases from said first position to the second position.

Provided within the duct 12 ahead of the engine 10, in the region of the duct leaving said first internal diameter, is an annulus 15, i.e. a hollow open-ended tube of annular cross-section. The annulus 15 is co-axial with engine 10 and duct 12 and can be moved axially within the duct 12 as described below. A sensor 16 fixedly supported by duct 12 is provided adjacent the inlet to engine 10 for sensing the total air pressure at the inlet to the engine 10. A second sensor 17 fixed in duct 12 is located at the inlet to the annular-section passage 200, i.e. to the part of the duct 12 interior surrounding the engine, to measure total air pressure of the air mass flow entering this part of the duct 12. A third sensor 18 is fixedly located in the duct 12 in close proximity to the final propelling nozzle of the engine to measure air velocity and a fourth sensor 19 is fixedly located downstream of the propelling nozzle of the engine 10 to measure jet stream velocity. The annulus 15 directs airflow to the engine 10 and has an inner diameter approximately 80% of that of the inlet to the engine 10. At high forward aircraft velocities the air mass induced into the secondary motion system formed by the duct 12 does not cause the engine 10 to be starved of air. The annulus 15 can be moved relative to the duct 12 by rams 20, as described in more detail below by reference to FIGS. 8 and 9.

It will be understood that there is defined between the leading edge 44 of engine casing 21 and the adjoining frusto-conical region of the internal wall of duct 12, extending between said first and second positions, an annular entrance opening providing communication between the annular section passage 200 and the portion of the interior of duct 12 upstream of the engine 10. It will also be understood that the width of this annular entrance opening and hence its cross-sectional area can be varied by varying the longitudinal position of duct 12 relative to engine casing 21. By thus varying the size of this annular entrance gap, it is possible to vary, in operation, the quantity of air by-passing engine 10 via this annular section gap.

The stator casing 21 is externally streamlined to smooth the air flow within duct 12 around the casing 21.

Figure 7:
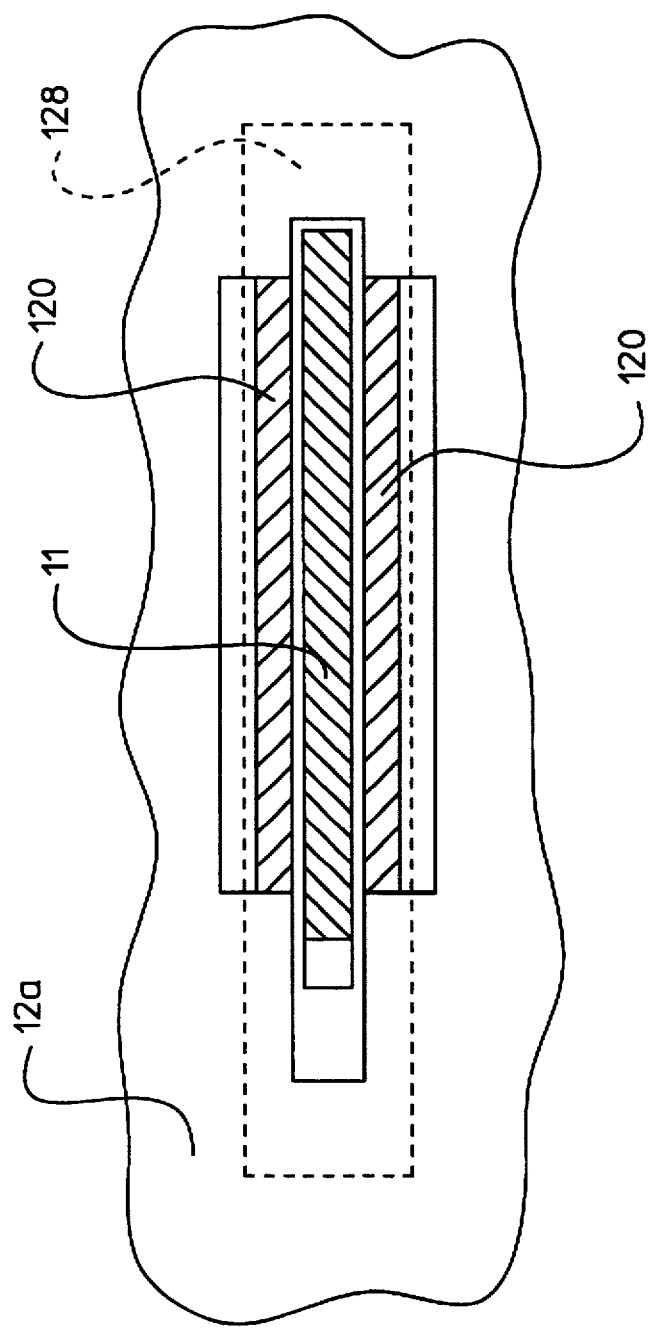
FIG. 7 is a fragmentary horizontal section view along the line VII—VII in FIG. 6.

Referring to FIGS. 5, 6 and 7 there is illustrated less schematically than in FIG. 1 and in more detail one mode of mounting the engine and duct 12 for longitudinal movement of the duct 12 around the engine 10 in the manner indicated above. In the arrangement illustrated in FIGS. 5 and 6, reference 100 represents pan of the aircraft structure, for example pan of the framework within a wing or within the fuselage of the aircraft, from which part the engine is suspended. The pylon 11, secured to structure 100, extends downwardly from the structure 100 as shown, from the wing or fuselage and into the duct 12, to the engine casing 21 of engine 10, through a longitudinal slot in the wall of duct 12 and which slot includes slots 113, 111 in the outer and inner wall or skins of duct 12, respectively. For ease of illustration in FIG. 6, the engine 10 is again not illustrated in detail, and in particular the conventional rotor assembly is not shown at all, but it will be understood that the lower end of pylon 11 is fixed to the stator of engine 10 (i.e. to the non-rotating part thereof), to which the casing 21 is likewise secured. It will be understood that the pylon 11 is, in the manner known per se in pylon-mounted jet engines generally, provided with internal passageways carrying fuel lines for the supply of fuel to the engine, cables for conventional electrical controls, sensors, generator/motors etc. for the engine. The generally cylindrical duct 12, as illustrated in FIG. 6, comprises an inner cylindrical wall 12a co-axial with engine 10 and an outer cylindrical casing or cladding 12b, co-axial with the engine. The duct 12 also includes intermediate structure or framework, not shown in FIGS. 5 to 7, supporting the cladding 12b in fixed relation to the inner wall 12a. The region between inner wall 12a and cladding 12b provides, inter alia, space for the passage of hydraulic lines for actuators carded by the duct 12 and for the passage of electrical cables extending to the electrical sensors mounted in the duct. Such hydraulic lines and cables are indicated schematically at 116 and 117 in FIGS. 5 and 6.

The pylon 11 takes the form of a vertical slab or plate which has parallel flat vertical side walls extending in respective planes parallel with the axis of the engine 10 and which slab has a width, between said side faces, substantially less than the length, measured parallel with the engine axis, of the pylon. The pylon 11 passes as a sliding fit through longitudinal slot 111 in the inner duct wall 12a, at the top of the latter, through a space between the inner wall 12a and the cladding 12b and through longitudinal slot 113 in the cladding 12b. In the arrangement shown, the duct 12 is supported by brackets 120, one on each side of pylon 11, the brackets being secured at their lower end to the framework, (not shown) of the duct 12 or to inner wall 12a as shown, the brackets 120 extending upwardly through slot 113. Each bracket 120 has, at its upper end, guides 122 through which passes, as a close sliding fit, a respective cylindrical rail 13 on the respective side of the pylon. The rails 13 extend parallel with the engine axis and with each other. Each rail 13 is secured with respect to the aircraft structure, for example being received in blocks 124 fixed to the pylon 11 or to the adjoining aircraft structure. As noted above, the brackets 120 and with them the duct 12, are capable of limited longitudinal sliding movement along rails 13, under the control of a double-acting hydraulic ram 14. It will be understood that, in order to allow this longitudinal movement, the slot in duct 12, and thus the slots 111, 113 are somewhat longer than the longitudinal dimension of the pylon 11 (measured parallel with the engine axis) where pylon 11 passes through these slots. Sealing means may be provided to prevent or limit passage of air to or from the duct 12 through slot 111. Such sealing means may comprise, as illustrated, a plate 128 fixed to pylon 11 and slidably but closely engaging the internal surface of duct wall 12a on either side of slot 111 and ahead of and behind the slot 111, and carrying seals cooperating with such inner surface further to improve such sealing, as indicated in FIG. 7 which is a partial substantially schematic view in horizontal section on line VII—VII in FIG. 6, looking downwardly, and in which the edge of sealing plate 128 is indicated in broken lines.

Figure 8:
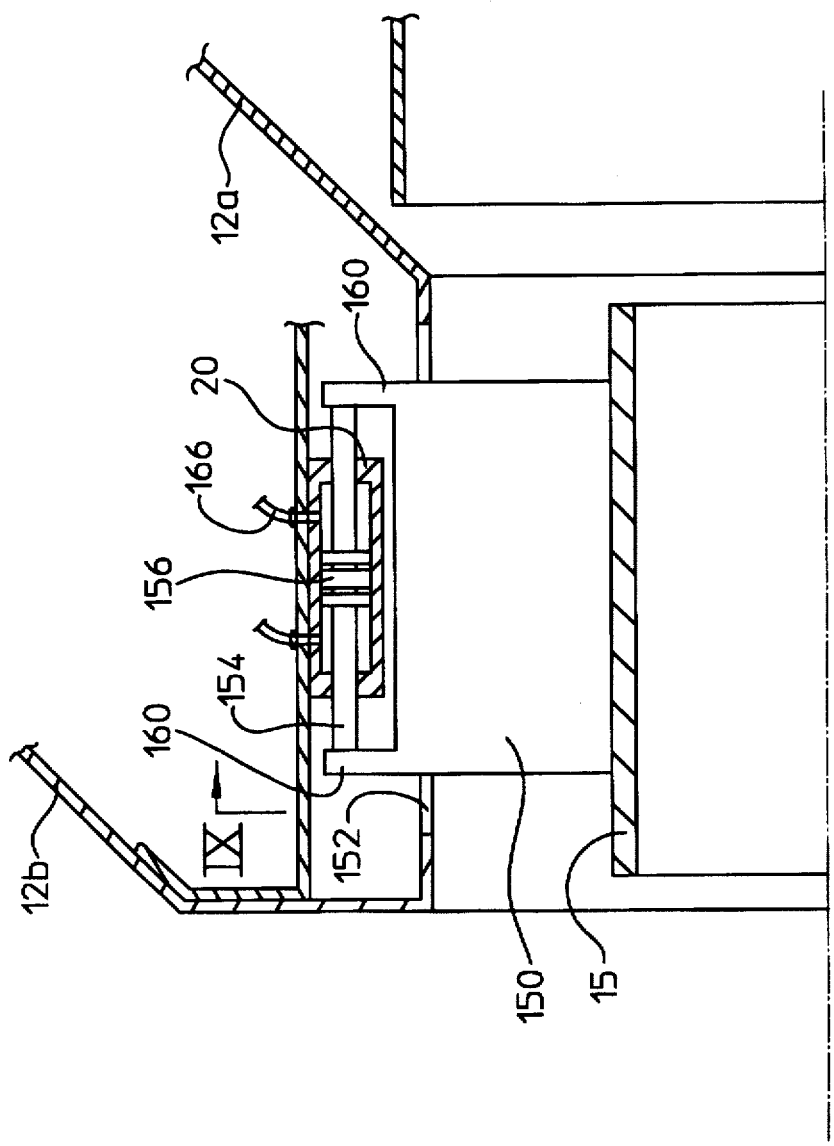
FIG. 8 is a fragmentary view in vertical section along the axis of the jet engine showing a portion of the system of FIG. 1 in the region of an inlet to the system.
Figure 9:
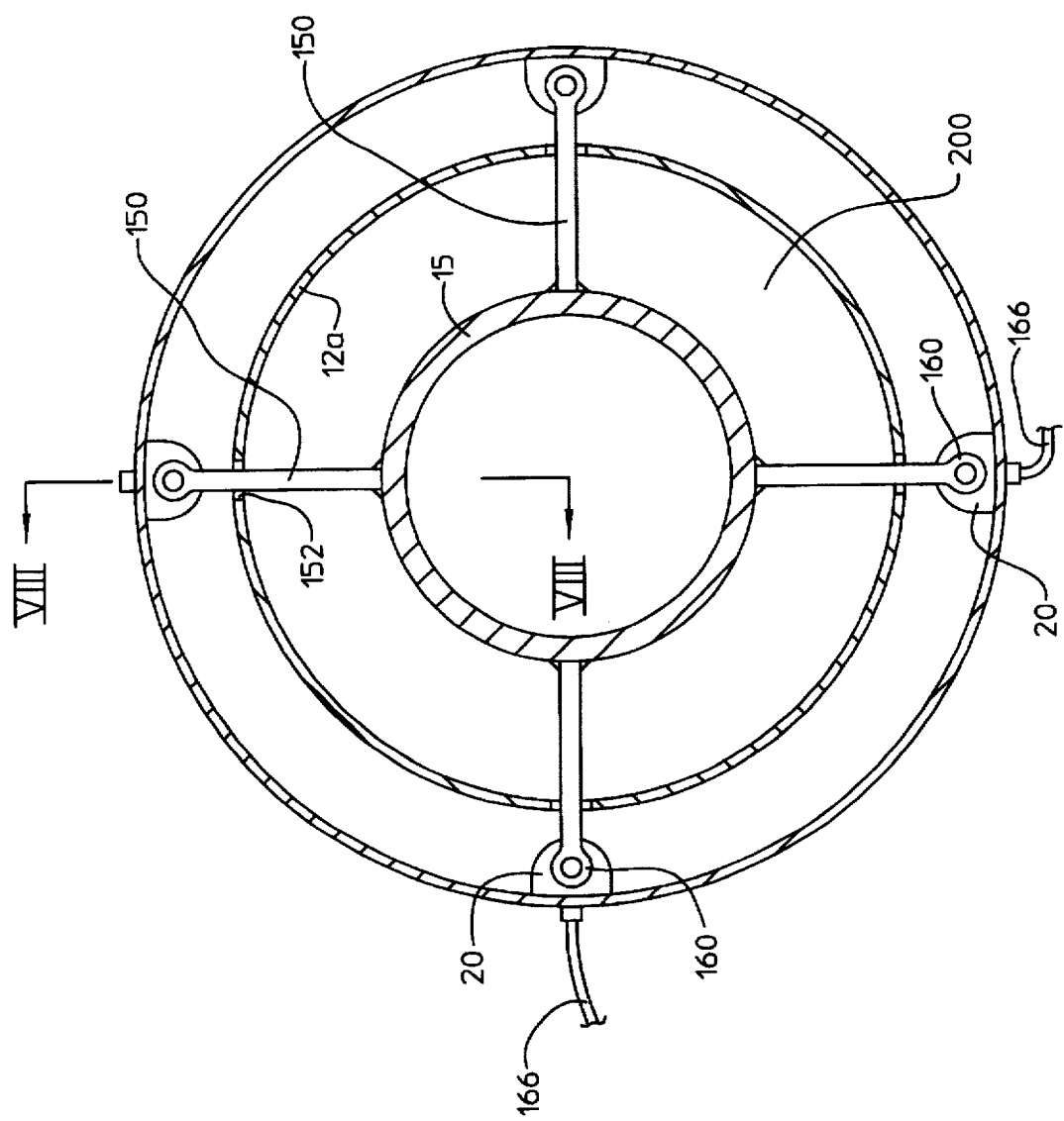
FIG. 9 is a fragmentary view in cross-section along the line IX—IX in FIG. 8, and corresponds to a cross-sectional view along line IX—IX in FIG. 1.

FIGS. 8 and 9 are, respectively, a half-axial section view, and a view in cross-section, of the front portion of the assembly of FIG. 1, in one possible configuration. That is to say, FIG. 8 is a view in section along the longitudinal axis of the assembly, more particularly on the line VIII—VIII of FIG. 9, only the portion above the axis being shown, for convenience, since the portion below the axis is a mirror image of the portion above, while FIG. 9 is a view in cross-section along the line IX—IX of FIG. 8.

Neglecting the schematic nature of FIG. 1, FIG. 9 is effectively also a view in cross-section on the line IX—IX in FIG. 1.

Referring to FIGS. 8 and 9 the annulus or tube 15 is in the form of a hollow tubular cylindrical body open at either end and co-axial with the jet engine. This hollow cylindrical body is supported within the inlet region of the passage through duct 12 by four supporting arms 150 arranged at 90 degree intervals around the exterior of annulus 15. The arms 150 are in the form of flat plates or fins each having its median plane, parallel with the major sides thereof, lying in a plane containing the axis of the engine, so that the arms or fins 150 extend radially across the annular space between tube 15 and the inlet portion of the passage through duct 12 and are oriented so as to minimize the obstruction they present to air flow through this annular space. Each arm or fin 150 extends as a close fit through a respective slot 152 in the inner wall 12a of the duct in the region of the latter which defines the outer boundary of the annular passage defined on the outer side of annulus 15. On the radially outer side of such slot, each fin 150 is secured to a piston rod 154 of a respective ram 20, the body or cylinder of which is secured to the duct frame structure disposed between the inner and outer walls 12a, 12b of the duct 12 and fixed with respect to such inner and outer walls. In the arrangement shown in FIGS. 8 and 9, each ram 20 is double acting and includes a central piston 156 through which the rod 154 passes to extend on either side of the piston. Each piston 156 is slidable sealingly within a respective cylinder having its axis parallel with the axis of the jet engine. Each piston rod 154 has a respective part extending axially from each end of its piston and sealingly through a respective end of the cylinder, the respective fin 150 having at its forward and rearward ends, at the radially outer limit of the fin 150, respective lugs 160 secured to a respective outer, free end of the respective piston rod 154. The fins 150 form a kind of supporting spider for annulus 15, the rams 20 serving to support the outer ends of the fins for longitudinal movement as well as providing the means for effecting such movement. The chambers defined within each ram body 20 on either side of the piston 156 therein are connected via respective hydraulic lines 166 which are among the lines which are connected, via brackets 120 as described above and via flexible connections 115 extending from brackets 120 into the aircraft structure, with conventional control valves and conventional hydraulic circuitry, pumps, etc. within the main aircraft structure for controlling the longitudinal position of the annulus 15. It will be understood that the rams 20 are connected in parallel with one another and are double-acting. A position sensor, not shown, may be provided for sensing the longitudinal position of the annulus 15 and transmitting information as to such position along electrical conductors also connected via brackets 120 with monitoring and control circuitry carried by the aircraft. Sealing means, for example similar to the means 128 associated with pylon 11, may be carried by each fin 150 for cooperation with the inner duct wall 12a in the inlet region of the duct, to prevent or minimize air flow through the slots 152.

During take-off of the aircraft, the duct 12 will be moved forward relative to the engine 10 as the air mass flow increases and the air flowing through the duct 12 is expanded to do work on the aircraft via the duct 12.

Figure 2:
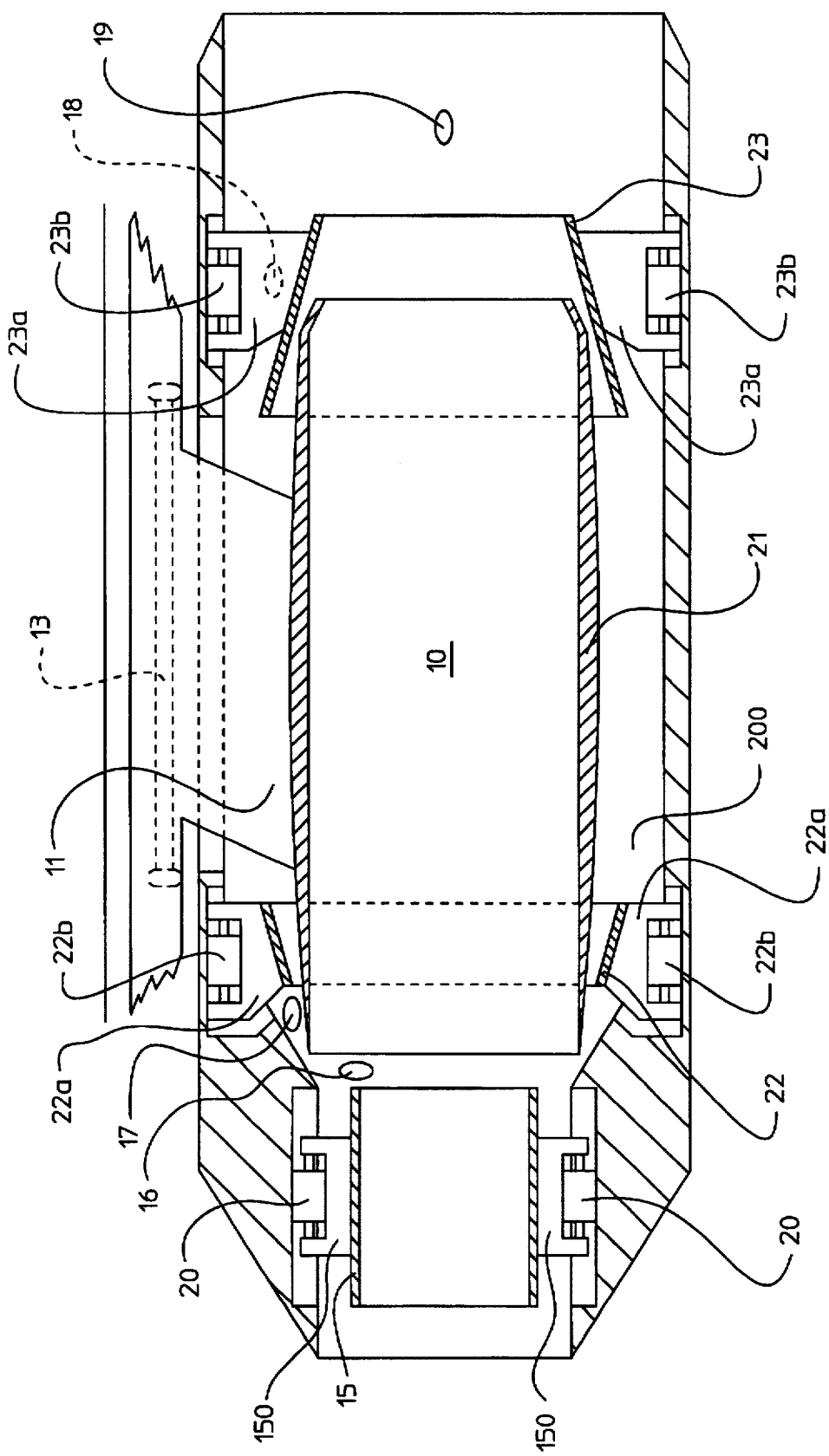
FIG. 2 is a diagrammatic view, similar to FIG. 1, in longitudinal section through the second embodiment.

The system of FIG. 2 differs from that described above with reference to FIG. 1 and FIGS. 5 to 9 in having two additional control arrangements. One such additional control arrangement comprises an annulus 22, in the form of a hollow frusto-conical shell 22, open at either end, and which is of annular cross-section (i.e. section perpendicular to the engine axis) and which is coaxial with engine 10. The annulus 22 increases in diameter from its upstream end to its downstream end. The annular shell 22 is disposed at least partially in the region over which the internal diameter of duct 12 increases frusto-conically and is spaced radially both from the engine casing 21 and from the wall of the duct 12. The second additional such control arrangement likewise comprises a hollow frusto-conical shell 22, open at either end, which is of annular cross-section and which is co-axial with engine 10. The annulus 23 decreases in diameter from its upstream end to its downstream end. The annular shell 23 is disposed in a region extending from a position somewhat upstream of the outlet end of engine casing 21 to a position somewhat downstream of the outlet end of engine casing 21. The annulus 23 is likewise spaced radially both from the engine casing 21 and from the wall of duct 12.

The annuli 22 and 23 are each supported from the wall of duct 12 in substantially the same way as annulus 15, i.e. in substantially the way described above with reference to FIGS. 8 and 9 in relation to annulus 15. Thus fins 22a, 22a, lying in respective radially extending planes containing the axis of engine 10 extend from the radially outer sides of annuli 22, 23 respectively, through respective slots in the inner wall of duct 12 and are connected with hydraulic rams 22b, 23b respectively mounted in the duct 12 between the inner and outer walls of the latter, such rams having their axes extending parallel with the axis of engine 10. The rams 22b, 23b are connected with hydraulic lines which, like those connected with rams 20, extend to brackets 120 where they communicate via internal passages in brackets 120 with further, flexible, hydraulic lines connected with hydraulic control means carded by the aircraft structure 100. The rams 22b, 23b for annuli 22, 23 have respective position sensors (not shown), for sensing the axial positions of annuli 22, 23 which are connected with respective cables extending via brackets 120, to control means carded by the aircraft structure. As an alternative mounting arrangement for annuli 22,23, these may be supported directly from casing 21, rather than from duct 12, each by a plurality of fins, lying in respective longitudinal planes, extending radially inwardly from the annuli 22, 23 to rams carded in the casing 21 and lying parallel with the engine axis, these rams being connected via respective hydraulic lines or conduits extending through pylon 11 to the aircraft supporting structure. In the variant of FIG. 4, the annulus 22 is supported from engine casing 21 in this fashion.

The arrangement of FIG. 2 also differs from that of FIG. 1 in that in FIG. 2, the outlet of casing or duct 12 is provided by a frusto-conically converging nozzle portion, whereas in FIG. 1, the internal diameter of the duct 12 remains substantially constant from the region midway along the engine 10 to the exit from duct 12. Of course, the duct 12 of FIG. 2 could have a constant internal diameter from the region midway along engine 10 to the exit from duct 12, as could, for example the ducts 12 of the arrangements of FIGS. 2 and 4, or indeed of the arrangements of FIGS. 12 to 15. Each of the embodiments of FIGS. 2 to 4 has sensors corresponding to sensors 16, 17, 18 and 19 of FIG. 1, similarly located. However, sensors 17 and 18 are concealed from view in FIGS. 2 and 3 by fins 22a and 22b. It will be understood that while it might appear from FIG. 2 that there is a danger of mechanical interference between the annuli 22, 23 and the actuating mechanisms therefor, on the one hand, and pylon 11 and the mounting and actuating arrangements for the duct 12, in practice the fins 22a, 23a need not be in the same axial plane as pylon 11 but may, for example, be disposed in planes inclined at 45 degrees to the vertical plane of pylon.

The variable annuli 22 and 23 are used to smooth the air flow when entering and leaving the annular-section passage 200, which forms a secondary system. Annulus 23 is also used to provide means of mixing and balancing the velocities of the exit airstreams.

Figure 3:
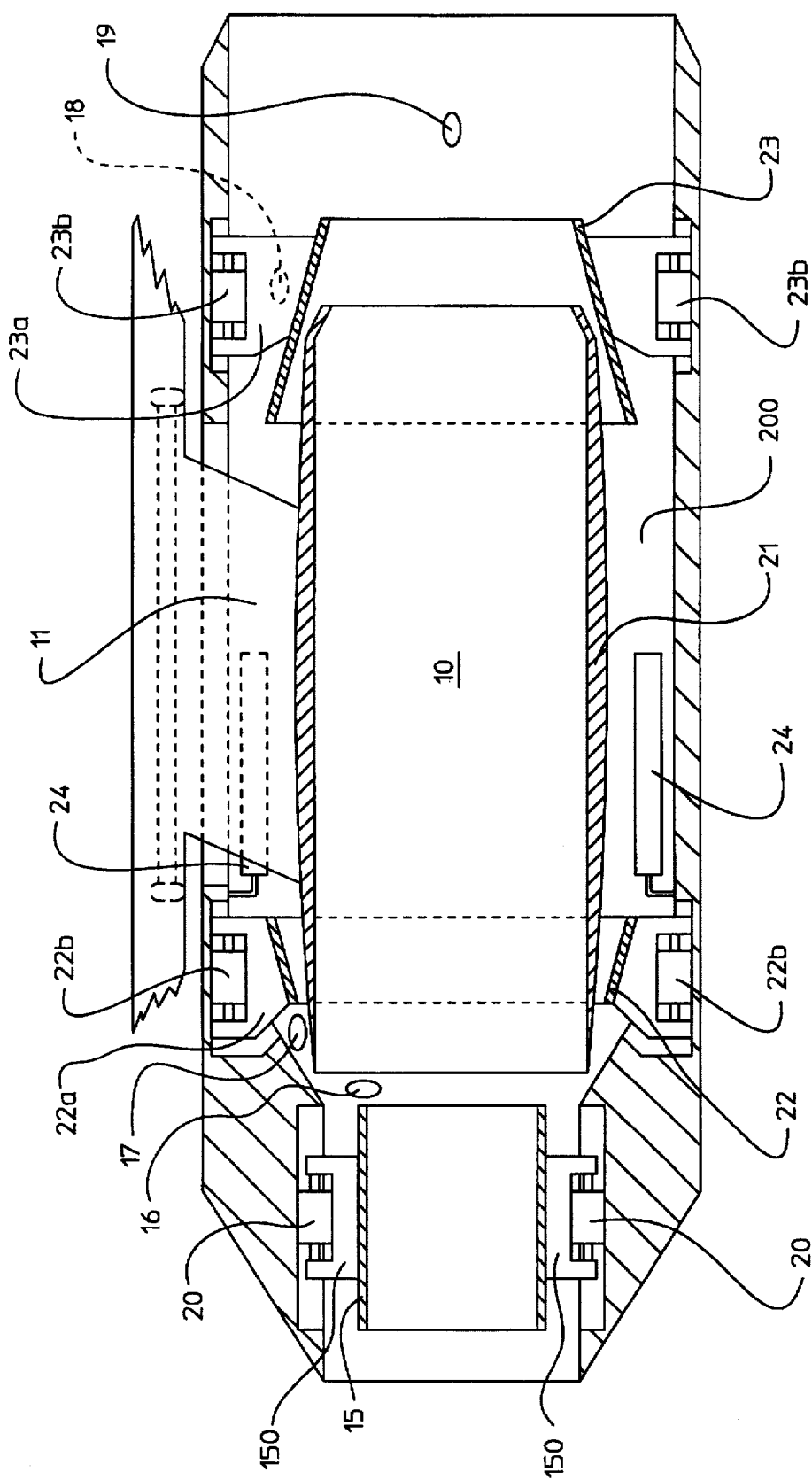
FIG. 3 is a diagrammatic view, similar to FIGS. 1 and 2, in longitudinal section through a third embodiment.

The embodiment of FIG. 3 is identical with that of FIG. 2 except that whereas the arrangement of FIG. 1 is characterized by the lack of any means for injecting fuel into the annular passage 200, in FIG. 2, a combustion system is provided in annular passage 200. The combustion system comprises burners and/or fuel injectors 24 carried by pylon 11 and supplied with fuel via fuel lines extending within pylon 11. The combination system 24 is operated in parallel with that of engine 10.

The embodiment of FIG. 4 is similar to that of FIG. 3 but differs from that of FIG. 3 in that in this embodiment the inlet area of the annular entrance gap leading to the annular space 200 defined between casing 21 and duct 12 and which area is herein referred to as the secondary system inlet area, is greater than that of the engine inlet, whereas in the embodiments of FIGS. 1 to 3, this area is less than that of engine 10 and may be variable, by varying the axial position of duct 12 relative to the engine, from substantially zero to a value close to that of the inlet to the jet engine.

It is envisaged that the ratio of the secondary system inlet area to that of the jet engine 10 in an embodiment in accordance with FIG. 4 may be anything from 1:1 upwards. In the event that the ratio of the secondary system inlet area to that of the jet engine 10 is greater than 1:1, then the annulus 15 should have an internal diameter at least equal to the inlet area of the jet engine 10 itself.

It is envisaged that the ratio of the secondary system inlet area to that of the jet engine will be set higher for supersonic and hypersonic velocities. For high cruise and long range performance a ratio as high as the existing fan jet engine by-pass ratios would probably prove to be desirable.

In the embodiment of FIG. 4, an inner annulus is located at the inlet to the secondary system having an inner diameter equal to that of the jet engine/core engine inlet.

In each embodiment it is envisaged that the duct 12 will extend beyond the exit nozzle of the jet engine 10 by an amount equal to approximately one third of the overall length of the jet engine 10. This distance must be sufficient to optimize the mixing between the respective airstreams from the annular passage 200 and the jet engine 10 before these airstreams leave the downstream end of the duct 12.

As illustrated in FIG. 4, the embodiment of that Figure has burners and/or fuel injectors 24 mounted within the duct portion 200. However, it will be understood that, if desired, the burners of fuel injectors 24 may be omitted from the embodiment of FIG. 4, as they may be from the embodiment of FIG. 3. Likewise, if desired, burners or fuel injectors 24 may be mounted in annular passage portion 200 in the embodiments of FIGS. 1 and 2.

The annulus 15 provides a means of controlling conditions in the region upstream of the annular entrance gap between the leading edge of engine casing 21 and the opposing frusto-conical wall portion of duct 12. By forming a barrier between the air-flow adjacent the peripheral internal wall of duct 12 upstream of engine 10 and the airflow closer to the engine axis upstream of the latter, the wall of annulus 15 makes it possible to maintain significant velocity differences between such peripheral air flow and such axial air flow. Consequently, the extent to which pressure and flow conditions in the inlet of the jet engine influence the amount of air bypassing the engine 10 via the annular passage 200 can be controlled by adjustment of the axial position of annulus 15 relative to the engine 10 and duct 12.

The total pressure sensing instruments 16 and 17 located at the inlets to the jet engine 10 and the secondary system of this invention, are required to have a reset pressure bias in favor of the inlet to the jet engine 10. The control system may operate to maintain a positive total pressure balance in favor of the jet engine 10 for all aircraft velocities in order to avoid any starvation condition being created at its inlet. However, this bias is preferably small.

Similarly, the control system is arranged to maintain a predetermined ratio between the secondary airstream exit velocity and that of the jet engine 10 or at least to maintain such ratio within a predetermined range. This ratio may be required to be variable to optimize the system for different conditions. The annulus 23 may be adjusted in position to provide optimum performance for the selected said velocity ratio.

Adjustment of annulus 23 allows control of the degree of volume mixing taking place between the respective airstreams in order to establish an optimum exit velocity for both airstreams before leaving the final exit nozzle of the combined system, (i.e. the exit from duct 12). The effective cone angle of the annulus 23 may be made variable, for example by constructing the annulus as a series of circumferentially adjacent flaps pivotally mounted in an annular frame carrying actuator devices for adjusting the angle of these flaps.

It is also envisaged that in cold running conditions of duct 12, i.e. in operation without burners 24, the exit airstream energy from the jet engine 10 will be utilized by the judicious mixing of the airstreams from duct 12 and engine 10 by using the variable inner annulus 23 located between the exits from these respective systems thereby ensuring that the secondary exit air flow velocity is always greater than both its inlet velocity and that of the aircraft at any instant in flight.

In the hot running condition, i.e. when fuel is being burnt in annular passage section 200, both the velocity and pressure of the respective airstreams can be balanced before leaving the final exit nozzle of the combined system. It is envisaged that it will be desirable in the hot running condition that the outer airstream should be kept at a higher relative pressure than the inner airstream from engine 10. In this way the higher velocity energy of the inner airstream can be used to accelerate the outer airstream thereby changing its positive pressure bias to matching velocity of the inner airstream.

In the cold running condition the aircraft after take-off will reach a state of choke at the inlet to the jet engine. As the total air pressure at the inlet, relative to that in passage 200, begins to rise, this will be sensed by the air pressure measuring devices 16, 17. As soon as the ratio of the inlet pressure to the pressure in passageway 200 begins to exceed the desired pressure ratio for that condition of flight, an electronic control system actuates ram 14 to move the outer annulus 12 forward relative to the engine 10 thereby allowing the main inlet airstream to spill into the secondary system (passage 200), counteracting the tendency for the total inlet pressure to rise. The control system controls the annular gap between the leading edge of casing 21 and the opposing frusto-conical surface of the duct 12 so as to maintain the desired air pressure ratio. In parallel with this operation, the inner annuli 22 and 23 respectively, will be caused to smooth the flow of air through the secondary system such that the downstream exit velocity is at all times greater than the inlet velocity to the duct system and higher than the relative aircraft velocity at any instant. In this instance the higher downstream velocity of the hot gas stream leaving the jet engine 10 will be used to induce the required increase in the exit velocity from annular passage portion 200 by mixing of the gas stream from the jet engine 10 with the air at the exit from annular section 200 thereby maintaining the required positive velocity balance across the secondary system. The inner annulus 23 is located so that the exit from the secondary system will also be caused to create the degree of airstream mixing necessary to induce the required velocity balance across the second system. This velocity balance across the secondary system will at all times be greater than the aircraft velocity at any instant. The system will be particularly advantageous in the descent phase.

The required positive velocity balance across the secondary duct propulsion system will be maintained regardless of whether the aircraft is accelerating or decelerating. The only condition necessary to activate the secondary propulsion duct system is the total inlet pressure ratio limit set at the inlet to the jet engine 10 for all inlet air velocity conditions as determined by the respective engine and aircraft designers of the particular aircraft.

The operation for the hot condition (FIGS. 3 and 4) is as for the cold condition except that the introduction of heat into the secondary system will involve a reprogramming of the parameters of velocity and pressure acting across the secondary system. Essentially, this will involve no more than a redefining of the relative angle changes to the inner annulus 23 located at the exit to the secondary system to optimize the velocity balance between both airstreams before reaching the final variable propelling nozzle. The introduction of heat energy into the secondary system can usefully be brought about as soon as the control choke state is exceeded at the engine inlet.

It is envisaged that the initial acceleration towards take off velocity will be initiated in the normal way using the power of the jet engine 10 but the secondary combustion system 24 can be usefully activated at any convenient time or condition. The secondary combustion system 24 will be particularly useful at supersonic and hypersonic speeds.

To compensate for the loss of power during take-off at high ISA conditions and or at altitudes above 1000 ft, the bias at the inlets to the respective systems should require the inlet gap between them to be relatively increased in order to optimize the conversion of the higher airstream temperature to velocity energy.

The secondary system is not mechanical and therefore, is less affected by outside ISA temperatures and in fact does not incur as great a propulsive thrust penalty because of it. Consequently, the payload penalty incurred because of high ISA temperature conditions prevailing at the point of take off can be reduced.

At high aircraft speeds, above supersonic speed, it would be more beneficial to switch the primary roles of both systems, the secondary system being used to produce the primary power and the engine taking on the role of secondary back up or, complementary propulsion system. In this way, the limitations imposed upon the thermal efficiency of the aircraft by the physical limitations of the systems comprising its jet engine/engines, in the primary mode, is appreciably reduced.

At speeds above Mach 2, the acceleration response capability of the aircraft using the secondary system as the primary source of power makes possible a tremendous improvement in its acceleration capability. The onset of the decrease in overall thrust with altitude can be appreciably delayed because it can be compensated for by increasing the airflow through the duct 12.

The hot running condition of the secondary system can usefully be initiated at any time. The velocity control in the hot condition is exercised in exactly the same way as for the cold running condition except that the final exit temperature of the airstream leaving the secondary system should not be allowed to exceed that of the jet engine when it is in use as the primary source of thrust because this would cause serious air flow disturbance and therefore thrust/velocity loss to the combined system and therefore to the aircraft. Here again, a pre-programmed exit temperature relationship between both exit airstreams can be chosen by the designers to cover the entire flight envelope of any particular aircraft application.

It is envisaged that the final propelling nozzle of the combined system would also be variable, making possible a final influence upon the relative airstream velocities before leaving the aircraft's propulsive system.

It is further envisaged that the whole operation whether in cold running condition, with or without the combustion option, can readily be controlled using a simple analog or digital computerized control device. Although the secondary combustion system at speeds of less than Mach 2 will operate at relatively low pressure, efficient combustion can still be obtained.

The operation of and control system for, the system of FIG. 4 is substantially the same as in the embodiments of FIGS. 1 to 3, in the cold and hot conditions. However, in the arrangement of FIG. 4, in which the cross-sectional area of the intake section of duct 12 is substantially greater than that of the jet engine 10 intake, the annulus 15 exercises a significantly greater control on the airflow through annular passage section 200 and thus, in effect, exercises some of the control function exercised by adjustment of the relative axial positions of duct 12 and engine 10 in the embodiments of FIGS. 1 to 3.

From an economic commercial operation point of view, it would be desirable to keep the overall velocity differences between the combined system relative to the resultant aircraft velocity as low as possible. This condition would in turn make possible the attainment of very high aircraft propulsion/motion system efficiencies. This condition would also require that the air mass flow velocity passing through the secondary system be as close as possible to the resultant aircraft velocity. In such an application it is envisaged that a by-pass ratio as high as that used in existing fan jet engines could be accommodated to advantage.

For fighter or any military applications where a high acceleration with high through air velocity performance is critical, then the by pass ratio could be somewhat less, probably somewhere between 2 and 4 to 1, the lower figure for the fighter application and the latter for the bomber or long range surveillance aircraft.

FIGS. 12 to 15 are views similar to FIGS. 1 to 4 showing further embodiments of the invention. In these Figures, parts corresponding to parts in FIGS. 1 to 4 have the same references. The embodiments of FIGS. 12 to 15 differ from those of FIGS. 1 to 4 principally in that, in FIGS. 12 to 15, the duct 12 is not movable longitudinally relative to pylon 11 and engine 10, but is fixed, while the duct 12 carries a rear end section or nozzle, referenced 26 which is mounted for limited longitudinal sliding movement relative to the main part of duct 12, by means of rams, indicated schematically at 25. Thus, in the embodiment of FIG. 12, the control of the mount of air bypassing engine 10 within duct 12 is effected principally by axial adjustment of annulus 15. In the embodiments of FIGS. 12 to 15, the cross-sectional area of the inlet portion of duct 12 is substantially greater than that of the jet engine 10 intake, as in the embodiment of FIG. 4. The rotor assembly of the jet engine is illustrated schematically in FIGS. 12 to 15. FIGS. 12 to 15 illustrate a preferred internal profiling for the duct 12 which is at its widest just behind the position of the leading edge of engine 10 and tapers continuously and increasingly towards the final exit from duct 12 provided by nozzle 26. Likewise, FIGS. 12 to 15 illustrate a preferred external profile for the casing 21, which is substantially more convexly rounded, as viewed in axial section, then in FIGS. 1 to 4. It will be understood that, as previously indicated, FIGS. 1 to 4 are schematic in some respects, and this applies to such features as the internal profiling of the duct 12 downstream of said second position therein and the external profiling of the casing 21. These profiles may, in practice, be closer to those illustrated in FIGS. 12 to 15 than shown in FIGS. 1 to 4.

For ease of illustration, the rams 20, 22b and 23b in FIGS. 12 to 15 are represented schematically merely as rectangles. However, it should be understood that the construction and operation of the rams 20, 22b and 23b in the embodiments of FIGS. 12 to 15, is substantially the same as described with reference to FIGS. 1 to 9.

Figure 10:
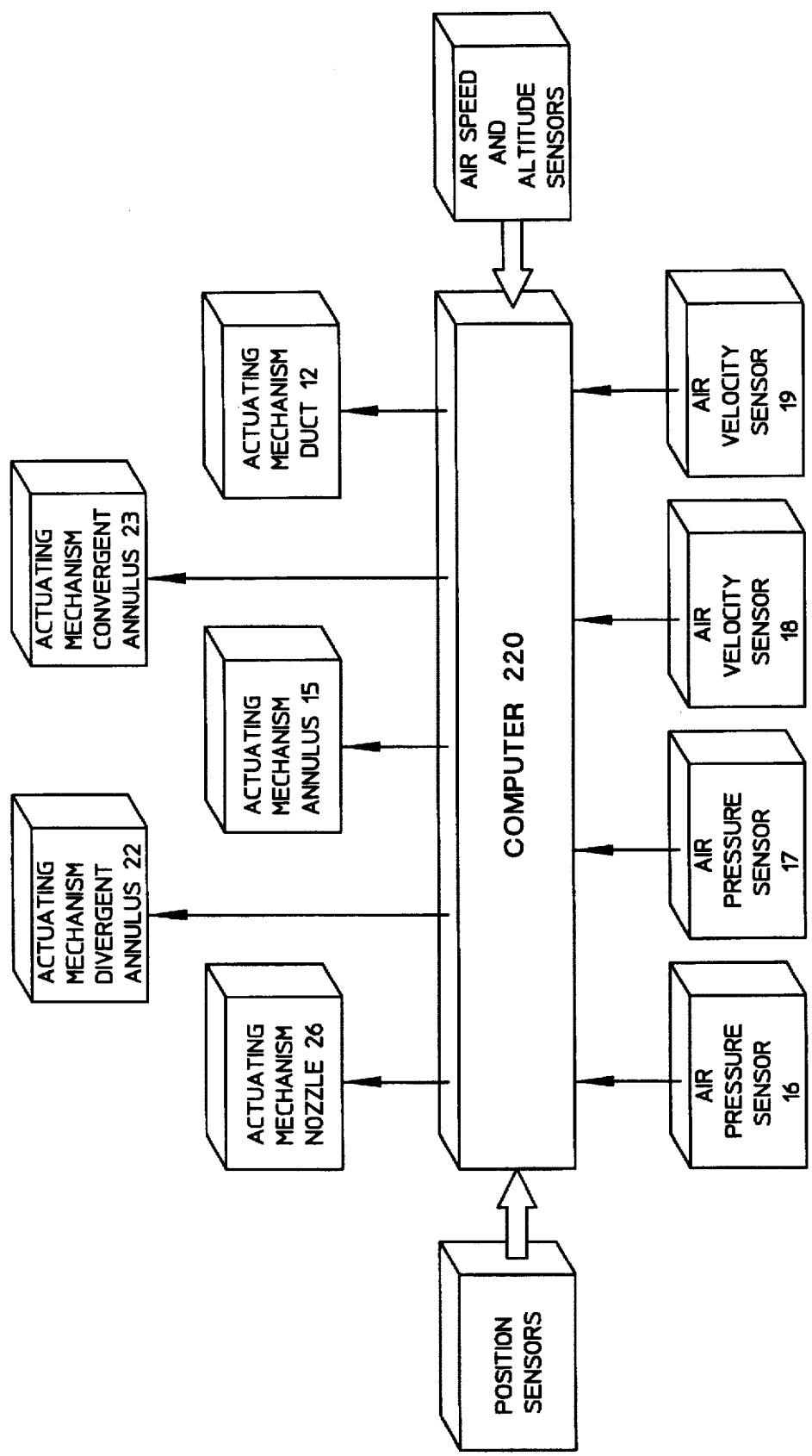
FIG. 10 is a diagrammatic block diagram illustrating a computer control means for the system.

Referring to the block diagram forming FIG. 10, the system of FIG. 2, for example, may be controlled by a computer control system comprising a computer 220 arranged to receive input signals from sensors 16, 17, 18, 19 and from the position sensors for duct 12 and annuli 15, 22 and 23, and to control rams 14, 20, 22b and 23b accordingly.

Figure 11:
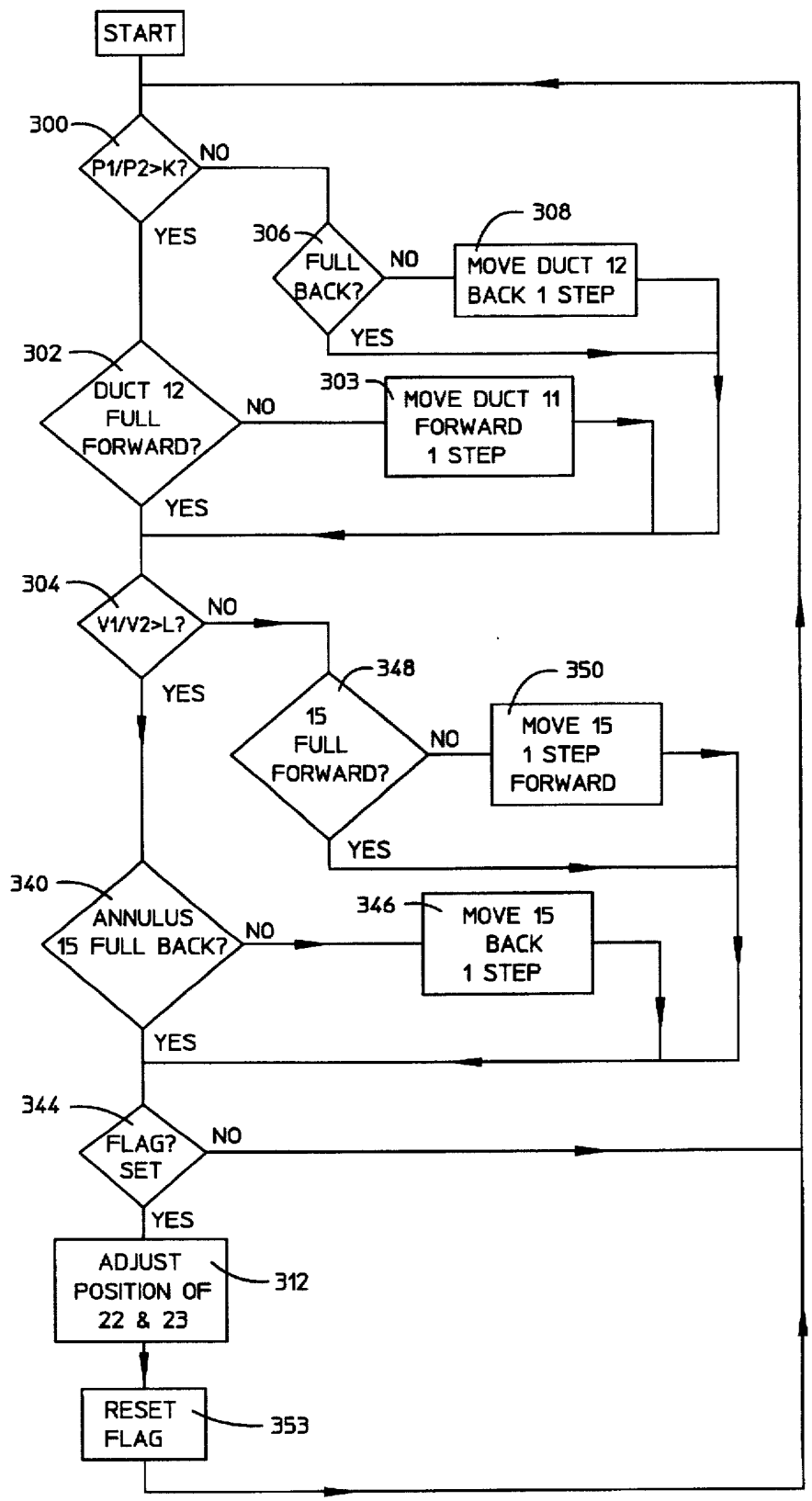
FIG. 11 is a flow-chart illustrating the operation of the system.

Referring to FIG. 11, a block diagram illustrating operation of the computer 220 is shown. The computerized control system, used to control the embodiment of FIG. 1, attempts, in its simplest form, to maintain a predetermined ratio, K between the pressure P1 sensed by sensor 16 and the pressure P2 sensed by sensor 17. The optimum value of K will vary according to engine and aircraft design and condition and may be determined empirically in a test rig or aircraft using a self calibration procedure provided as a feature in the control system software, but typically K=P1/P2 may be in the range 1.3 to 1, preferably 1.27 to 1.

The control system attempts to maintain the predetermined ratio P1/P2 by moving the duct 12 forwards relative to engine 10 if P1/P2>K and moving the duct 12 rearwards relative to engine 10 if P1/P2≦K. After each adjustment of duct 12 relative to engine 10, the control system then adjusts the axial position of annulus 15 in duct 12 so as to tend to maintain a predetermined ratio L between the air velocity V1 sensed by sensor 18 and the gas/air velocity V2 sensed by sensor 19 and moves annulus 15 rearward in duct 12 if V1/V2>L and moves annulus 15 forwards in duct 12 if V1/V2≦L. Again, the optimum value of L will vary according to engine and aircraft design and conditions and may be determined empirically, by-testing or using a self calibration procedure in the control system. However, the value of L used may typically be in the range ½ to ⅓. Having adjusted annulus 15 on the basis indicated, the control system will typically return to the procedure for adjustment of the axial position of duct 12 relative to the engine and so on in a repeating cycle.

The position of annulus 15 has, in fact, a very substantial influence on the ratio P1/P2, more marked, in fact, than upon the ratio V1/V2, and as noted below, in the embodiments of FIGS. 12 to 15 the position of annulus 15 is the principal means by which the ratio P1/P2 is controlled. However by repeated iteration of the control loop by which the positions of duct 12 and annulus 15 are adjusted, both ratios can be controlled.

Referring to FIG. 11, which is a flow chart representing operation of the control system, at step 300 the system determines if P1/P2>K. If so, the system proceeds to step 302 where it determines whether the duct 12 is already in its forward most position relative to engine 10. If so, the system proceeds to step 304 which is the start of the routine for adjustment of the position of annulus 15. However, if, in step 302, it is determined that duct 12 is not already in its forward most positions the system, in step 303, directs the ram 14 to move the duct 11 forwards by an increment and then proceeds to step 304.

If in step 300, it is determined that P1/P2 is not greater than K, the system proceeds to step 306 where it determines whether duct 12 is already at the limit of rearward movement relative to engine 10. If it is, then the system proceeds to step 304, otherwise it proceed to step 308 in which it directs ram 14 to move the duct 12 back by one increment before passing to step 304.

At step 304 the system determines if V1/V2>L. If so, the system proceeds to step 340 where it determines whether the annulus 15 is already in its rearward most position relative to duct 12. If so, the system proceeds to step 344 which is a branching point to a possible subroutine for adjustment of the position of annuli 22 and 23. However, if, in step 340, it is determined that annulus 15 is not already in its rearward most position, the system, in step 346, directs the rams 20 to move the annulus 15 backwards by an increment and then proceeds to step 344.

If in step 304, it is determined that V1/V2 is not greater than L, the system proceeds to step 348 where it determines whether annulus 15 is already at the limit of its forward movement relative to engine 10. If it is, then the system proceeds to step 344, otherwise it proceeds to step 350 in which it directs rams 20 to move the annulus 15 forward by one increment before passing to step 344.

The control system of FIGS. 10 and 11 includes provision for control of annuli 22 and 23, in FIGS. 2 to 4, by providing the computer with inputs representative of, for example, altitude and airspeed, and by including, as a subroutine represented by block 312, a routine adapted to adjust the position of annuli 22 and 23 in response to these quantities and possibly also in dependence upon P1 and V2, for example.

As annuli 22 and 23 exercise a "fine-tuning" function, this subroutine, indicated at 312 in FIG. 11 need only be carried out at relatively extended intervals, and thus may be executed only if a flag, set by a timer, or by an altitude change signal, for example, is set. Step 344 in FIG. 11 tests whether or not this flag is set. The appropriate positions for annuli 22 and 23 ray be determined in routine 312 from look-up tables, for example. The flag is reset at step 353 after the system exits from subroutine 312, after which the system returns to step 300. For the embodiment of FIG. 1, of course, the steps 344 to 353 are simply omitted.

Figure 12:
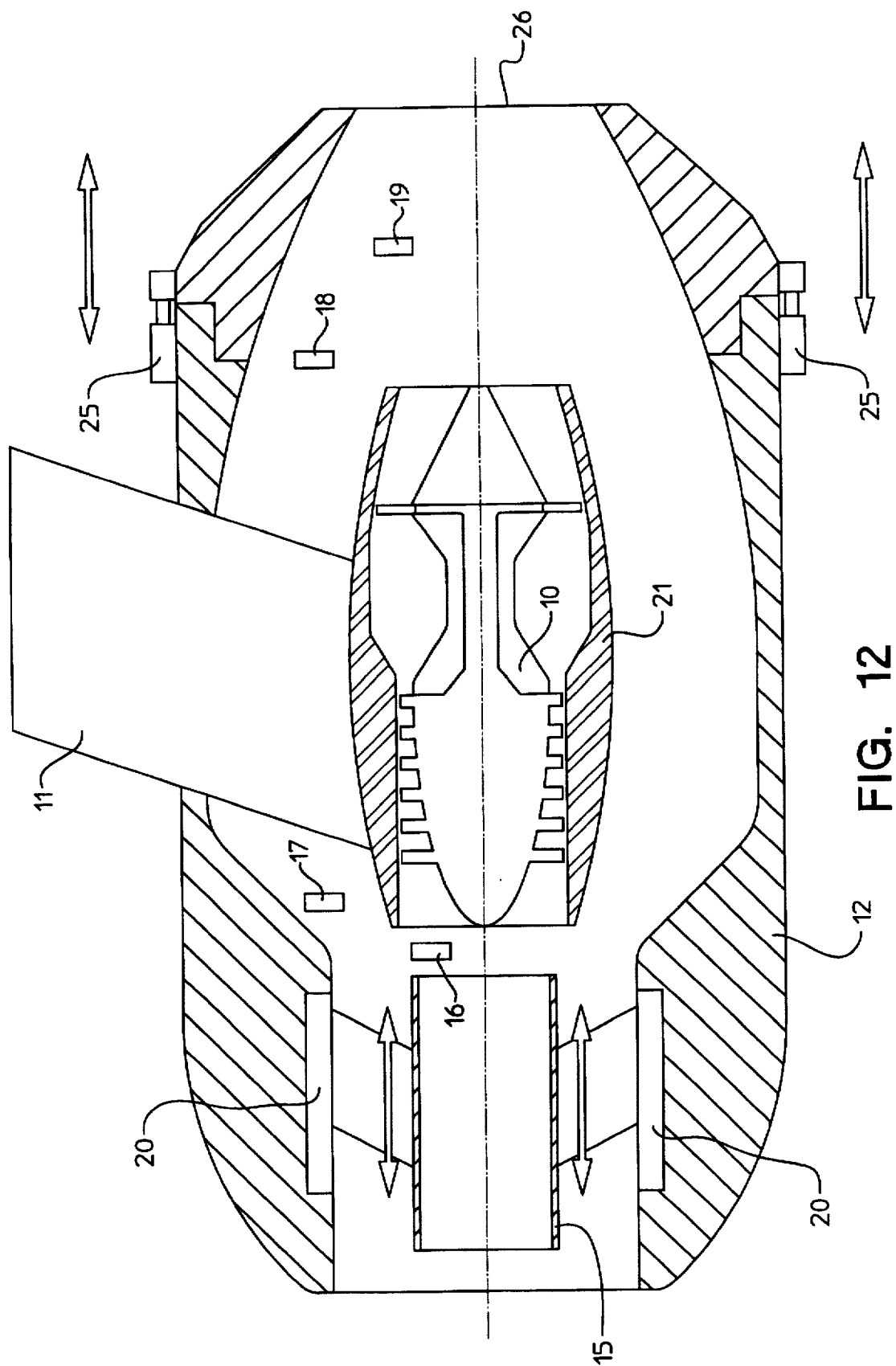
FIGS. 12 to 15 are diagrammatic sectional views, similar to FIGS. 1 to 4, but showing yet further embodiments.
Figure 13:
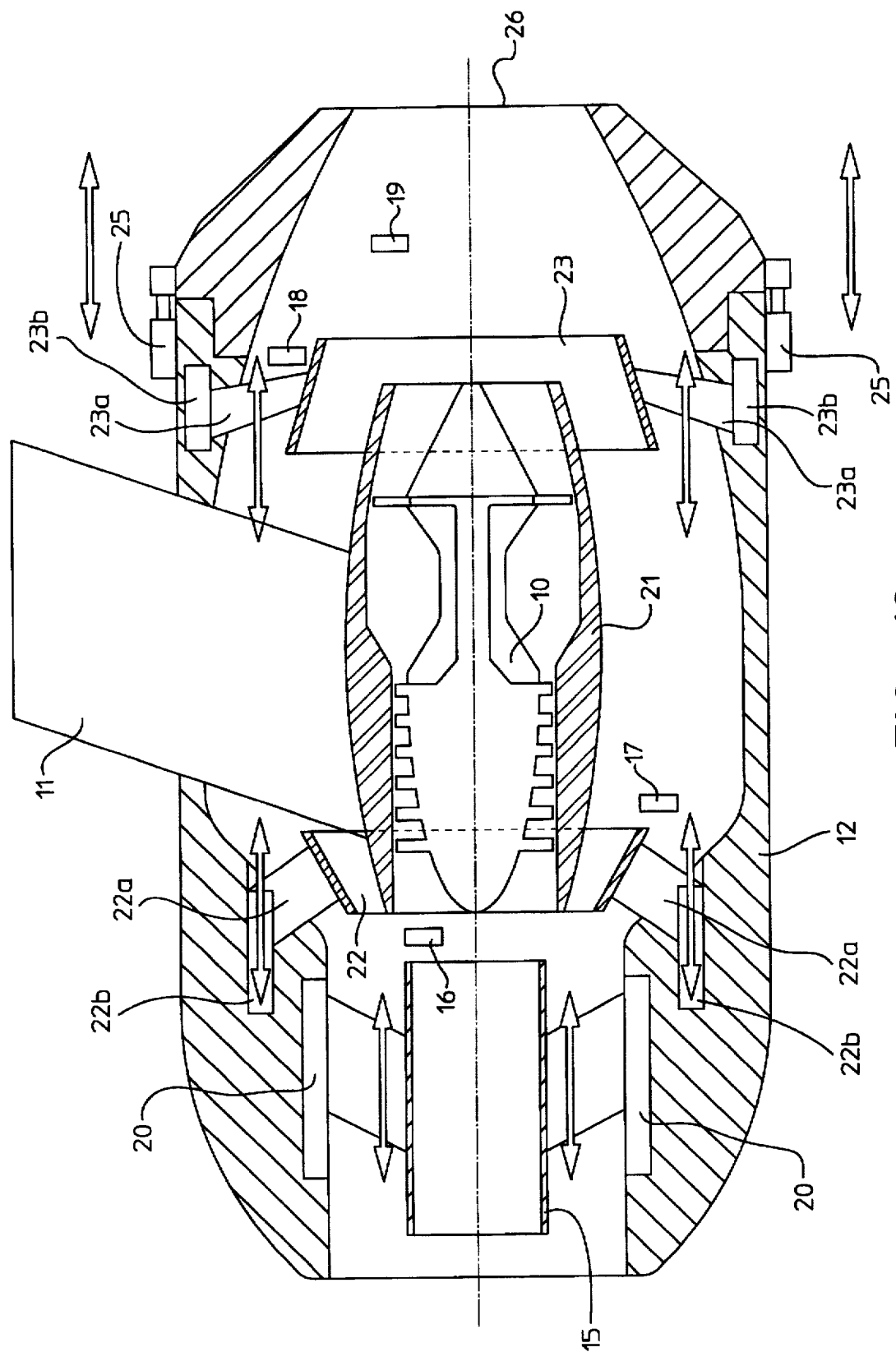
Figure 14:
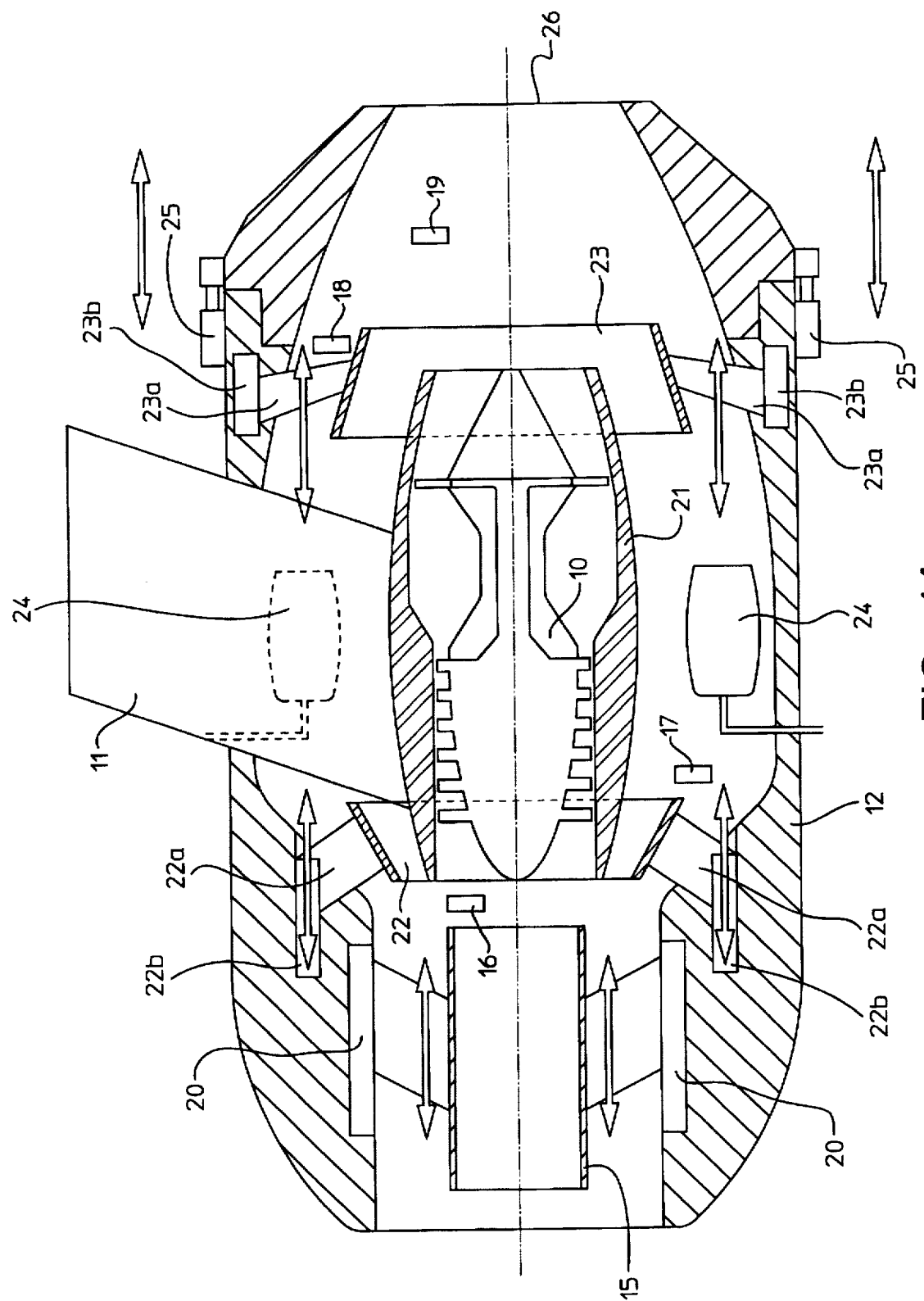
Figure 15:
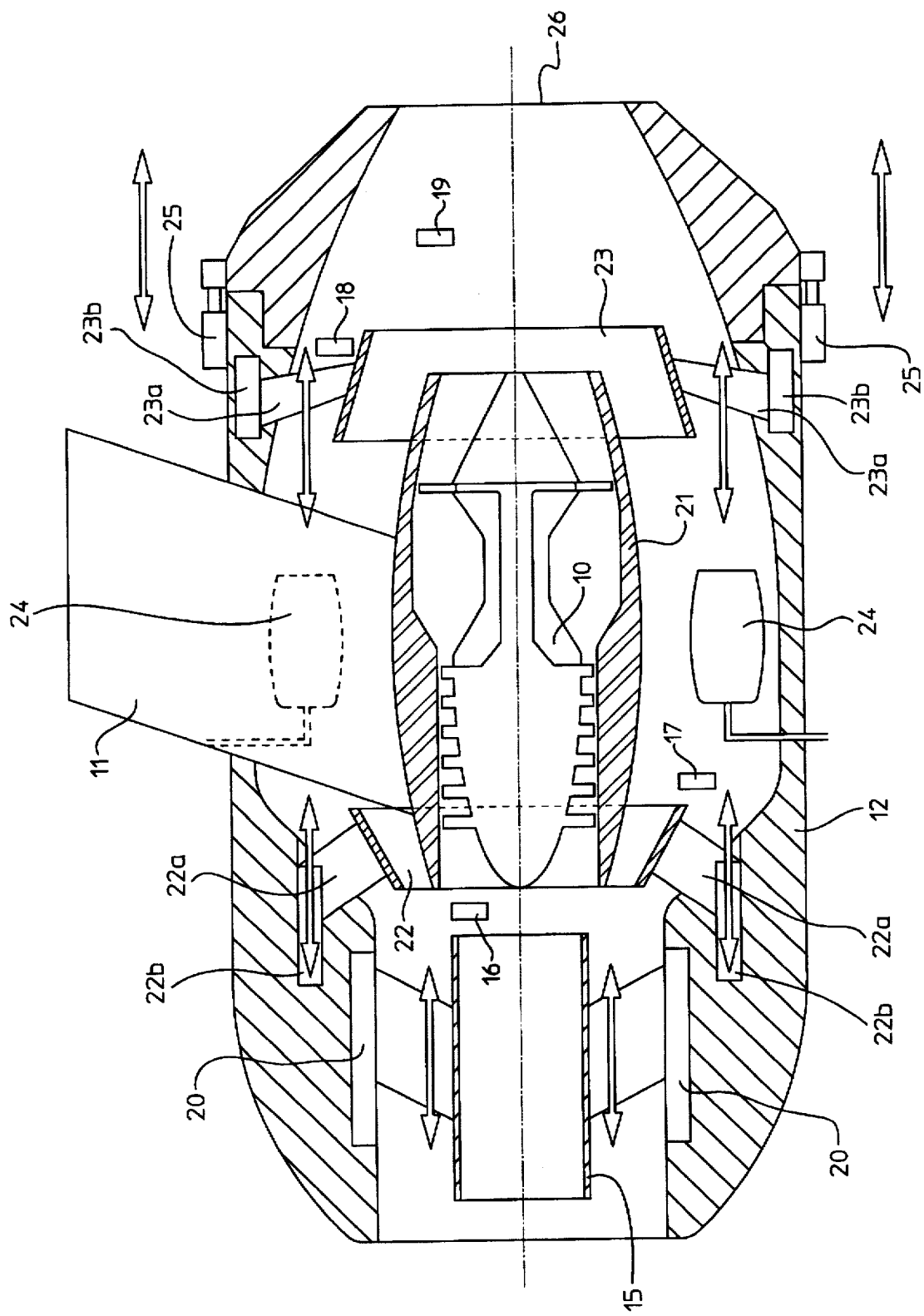

For the embodiment of FIG. 12, the annulus 15 is used to control the pressure ratio P1/P2, (i.e. the ratio between the pressures sensed by sensors 16 and 17 respectively) and is either controlled exclusively by reference to that pressure ratio, for example by moving the annulus 15 forwards or back in response to P1/P2 in exactly the same way as described in relation to duct 12 in FIG. 11 (and omitting steps 304, 340, 348, 350, 346 and 344 to 353 in the flow chart of FIG. 11, with the system returning to step 300 on exiting from step 304), or by controlling the position of annulus 15 in accordance with a quantity calculated by weighting the ratio P1/P2 by a factor dependent on V1 and V2. in the embodiments of FIGS. 13, 14 and 15, the position of annulus 15 may be determined by the pressure ratio P1/P2 with the air/gas stream flow speeds sensed by sensors 18 and 19 being used, inter alia, as a basis for adjustment of the position of annuli 22 and 23 or as a factor in determining: such adjustment.

In the embodiments of FIGS. 12 to 15, the control system also includes a routine for controlling the axial position (adjusted by means of ram 25) of the nozzle 26, on the basis of the ratio M between the Velocity V2 sensed by sensor 19, i.e. the final propelling nozzle velocity, and the resultant aircraft Velocity V3, (i.e. M=V2/V3). The optimum value of M will vary according to engine and aircraft design and may be determined empirically by testing or using a self calibration procedure in the control system. Typically V2/V3 may be in the ratio 1.3:1. If V2/V3>M, nozzle 26 will be caused by the control system to move rearwards relative to jet engine 10 while if V2/V3≦M nozzle 26 will be moved forwards. Having adjusted nozzle 26 on the basis indicated the control system will typically return to the procedure for adjusting the annulus 15 and so on, in a repeating cycle. The computer routine for controlling the position of nozzle 26 in dependence of ratio "M" may be substantially the same functionally as that described with reference to FIG. 11 for controlling the position of duct 12 independence of ratio "K".

The systems described with reference to the accompanying drawings have a function somewhat analogous to that of a gearbox in a road vehicle in that they allow the thrust power delivered by the jet engine to be utilized much more efficiently thereby enhancing the propulsive efficiency of the aircraft just as a road vehicle's gearbox allows the shaft horse power delivered by the vehicle's engine to be utilized more efficiently thereby, determining the propulsive efficiency of the vehicle.

Thus, the invention comprises a system that makes it possible to overcome the poor propulsive efficiency of existing propulsion systems employed by conventionally powered jet powered aircraft so that full control can be exercised over the propulsive efficiency of the aircraft in all demand conditions.

I claim:

1. An aircraft comprising an airframe structure, at least one jet engine having a longitudinal axis, said jet engine having a surrounding engine casing defining at opposite ends of said casing an inlet opening and an exhaust outlet centered on said engine axis, at least one engine support member extending from said engine to said airframe structure to support the engine, a further hollow casing enclosing said engine casing coaxial with the engine and spaced from the engine casing to define therewith an annular-section duct, said further casing having an inlet opening centered on said axis and disposed upstream of said inlet opening of the engine casing, an outlet opening centered on said axis and disposed downstream of said exhaust outlet of said engine casing, said further hollow casing having a first internal diameter at a first position upstream of said engine casing, a second internal diameter at a position downstream of the inlet opening of said engine casing and a region between said first and second positions over which the internal diameter increases from said first position to the second position, an annular inlet opening to said annular-section duct, said annular inlet opening being defined by the leading end of said engine casing and said region of the outer casing between said first and second positions, means mounting said further casing for longitudinal movement relative to said jet engine and said engine casing and said engine support member, whereby said annular entrance opening to said annular-section duct can be varied in size whereby, in use, the quantity of air by-passing the jet engine via said annular-section duct can be varied.

2. An aircraft comprising an airframe structure, at least one jet engine having a longitudinal axis, said jet engine having a surrounding engine casing defining at opposite ends of said casing an inlet opening and an exhaust outlet centered on said engine axis, at least one engine support member extending from said engine to said airframe structure to support the engine, a further hollow casing enclosing said engine casing coaxial with the engine and spaced from the engine casing to define therewith an annular-section duct, said further casing having an inlet opening centered on said axis and disposed upstream of said inlet opening of the engine casing, an outlet opening centered on said axis and disposed downstream of said exhaust outlet of said engine casing, said annular-section duct having at its upstream end an annular inlet opening to said duct, defined between the leading end of the engine casing and the inner surface of the further casing, means for varying the effective flow cross section of said annular inlet opening, a hollow annular cross-section member disposed in the upstream part of the interior of said further casing, upstream of said engine casing and coaxial with the engine, said annular cross-section member being spaced from the inner wall of said further casing to define a second annular-section duct therewith and defining an axial through passage internally of said hollow annular cross section member, support means for said hollow annular cross-section member, including support members extending from said hollow annular cross-section member across the second annular duct to said further housing and actuator means connecting said support members with said further housing and operable to displace said support members, and hence said hollow annular cross-section member, longitudinally relative to the outer housing and the inner housing, along the engine axis.

3. An aircraft as claimed in claim 2, wherein the inlet to said further casing has a frontal area greater than that of said inlet to said engine casing and said axial through passage of said annular cross-section member has a cross-sectional area which is substantially equal to that of said inlet to said engine casing.

4. An aircraft comprising an airframe structure, at least one jet engine having a longitudinal axis, said jet engine having a surrounding engine casing defining at opposite ends of said casing an inlet opening and an exhaust outlet centered on said engine axis, at least one engine support member extending from said engine to said airframe structure to support the engine, a further hollow casing enclosing said engine casing coaxial with the engine and spaced from the engine casing to define therewith an annular-section duct, said further casing having an inlet opening centered on said axis and disposed upstream of said inlet opening of the engine casing, an outlet opening centered on said axis and disposed downstream of said exhaust outlet of said engine casing, said further hollow casing having a first internal diameter at a first position upstream of said engine casing, a second internal diameter at a position downstream of the inlet opening of said engine casing and a region between said first and second positions over which the internal diameter increases from said second position to the first position, an annular inlet opening to said annular-section duct, said annular inlet opening being defined by the leading end of said engine casing and said region of the outer casing between said first and second positions, means mounting said further casing for longitudinal movement relative to said jet engine and said engine casing and said engine support member, whereby said annular entrance opening to said annular-section duct can be varied in size whereby, in use, the quantity of air by-passing the jet engine via said annular-section duct can be varied, and further including means for sensing the air pressure at points respectively upstream of the inlet to said engine casing and downstream of the inlet end of said engine casing but in the entrance portion of said annular-section duct, computer means receiving signals from said pressure sensing means and arranged to control said first actuating means in accordance with said signals.

5. An aircraft comprising an airframe structure, at least one jet engine having a longitudinal axis, said jet engine having a surrounding engine casing defining at opposite ends of said casing an inlet opening and an exhaust outlet centered on said engine axis, at least one engine support member extending from said engine to said airframe structure to support the engine, a further hollow casing enclosing said engine casing coaxial with the engine and spaced from the engine casing to define therewith an annular-section duct, said further casing having an inlet opening centered on said axis and disposed upstream of said inlet opening of the engine casing, an outlet opening centered on said axis and disposed downstream of said exhaust outlet of said engine casing, said further hollow casing having a first internal diameter at a first position upstream of said engine casing, a second internal diameter at a position downstream of the inlet opening of said engine casing and a region between said first and second positions over which the internal diameter decrease from said second position to the first position, an annular inlet opening to said annular-section duct, said annular inlet opening being defined by the leading end of said engine casing and said region of the outer casing between said first and second positions, means mounting said further casing for longitudinal movement relative to said jet engine and said engine casing and said engine support member, whereby said annular entrance opening to said annular-section duct can be varied in size whereby, in use, the quantity of air by-passing the jet engine via said annular-section duct can be varied, and further including means for sensing gas velocity at the exit end of said first annular-section duct and at the outlet of said jet engine and computer means receiving signals from said pressure sensing means and arranged to control said first actuating means in accordance with said signals.

6. An aircraft as claimed in claim 4, wherein the inlet to said further casing has a frontal area greater than that of said inlet to said engine casing and said axial through passage of said annular cross-section member has a cross-sectional area which is substantially equal to that of said inlet to said engine casing.

7. An aircraft as claimed in claim 5, wherein the inlet to said annular-section duct has a frontal area greater than that of said inlet to said engine casing and said axial through passage of said annular cross-section member has a cross-sectional area which is substantially equal to that of said inlet to said engine casing.

8. An aircraft as claimed in claim 1 including flow-controlling annuli, one of which is located in said annular duct in close proximity to the inlet to said duct, and the other located at the exit from said annular duct, said flow-controlling annuli being adjustable in longitudinal position relative to said engine and said further casing, further actuating means being provided for adjusting the position of said flow-controlling annuli.

9. An aircraft as claimed in claim 1 wherein said engine casing serves to smooth the air flow passing around the jet engine and through said annular-section duct and also serves as a heat shield.

10. An aircraft having a jet engine, a first casing surrounding the jet engine and defining at opposite ends of said casing an inlet opening centered on the engine axis and disposed upstream of the engine and an exhaust outlet downstream of said jet engine and centered on said engine axis, a second hollow casing axially enclosing from inlet to outlet the said jet engine, the first hollow casing enclosing the second hollow casing and spaced therefrom to define therewith an annular section duct centered on said engine axis, first hollow casing having a first internal diameter at a first position upstream of the inlet to said jet engine and a second internal diameter at a second position downstream of inlet to said jet engine and a region between said first and second positions, over which the internal diameter increases from said first position to said second position an entrance opening to said annular duct defined by the inlet to said jet engine and said region of outer casing between first and second positions, means whereby the quantity of air passing the jet engine via the annular duct-section can be varied, said means comprising an annulus mounted within the inlet to said first casing and located upstream of, and centered around, the axis of said jet engine, said annulus being spaced from the wall of said first casing to define a second annular-section duct therewith and defining an axial through passage an annulus support member means extending across said second annular-section duct to said casing said actuator means connecting said support annulus members with said casing and operable to displace the support annulus member means and hence said annulus, longitudinally relative to the outer casing and engine and duct inlet, along the engine axis, whereby in use, said annulus can be caused to move longitudinally relative to the inlets to the said duct and said jet engine to provide a means of ensuring that air mass flow required by the said jet engine to meet any demand condition is not denied to it, controlling annuli mounted within the first casing and comprising of a diverging annulus which is located in said annular duct in close proximity to the inlet to said duct and a converging annulus located between the exit from the said annular duct and exit from jet engine, said flow controlling annuli being adjustable in longitudinal position relative to said jet engine and said first casing by respective actuating means, said first casing comprising a final propelling nozzle downstream of the jet engine propelling nozzle, and which can be moved axially by further actuating means relative to both said casing and said jet engine.

11. An aircraft as claimed in claim 10, wherein the inlet to said first casing has a frontal area greater than said inlet to the jet engine, and said annulus has a cross sectional area which is substantially equal to that of the inlet to said jet engine.

* * * * *